(12) United States Patent
Han et al.

(10) Patent No.: US 12,316,191 B2
(45) Date of Patent: May 27, 2025

(54) FAN MOTOR

(71) Applicant: LG ELECTRONICS INC., Seoul (KR)

(72) Inventors: Cheol Han, Seoul (KR); Yongdae Kim, Seoul (KR); Giyeob Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 198 days.

(21) Appl. No.: 18/018,104

(22) PCT Filed: Apr. 1, 2021

(86) PCT No.: PCT/KR2021/004039
§ 371 (c)(1),
(2) Date: Jan. 26, 2023

(87) PCT Pub. No.: WO2022/035015
PCT Pub. Date: Feb. 17, 2022

(65) Prior Publication Data
US 2023/0268796 A1 Aug. 24, 2023

(30) Foreign Application Priority Data
Aug. 12, 2020 (KR) .................. 10-2020-0101319

(51) Int. Cl.
*H02K 5/20* (2006.01)
*H02K 5/173* (2006.01)
(Continued)

(52) U.S. Cl.
CPC ........... *H02K 5/207* (2021.01); *H02K 5/1732* (2013.01); *H02K 5/225* (2013.01); *H02K 7/083* (2013.01); *H02K 9/06* (2013.01)

(58) Field of Classification Search
CPC .......... H02K 5/225; H02K 7/083; H02K 9/06; H02K 5/1732; H02K 3/522; H02K 9/14; H02K 5/207
See application file for complete search history.

(56) References Cited

U.S. PATENT DOCUMENTS

2017/0294819 A1\* 10/2017 Crosby .................. B25F 5/008
2018/0216635 A1\* 8/2018 Hayamitsu ................ A47L 9/22
(Continued)

FOREIGN PATENT DOCUMENTS

| CN | 207782511 U | 8/2018 |
| CN | 209516803 U | 10/2019 |

(Continued)

*Primary Examiner* — Leda T Pham
(74) *Attorney, Agent, or Firm* — Birch, Stewart, Kolasch & Birch, LLP

(57) ABSTRACT

The present invention relates to a fan motor comprising: a housing; a vane hub received in the housing; an insulator mounted inside the vane hub to insulate a stator comprising a stator core and a stator coil wound on the stator core; and a lower bracket coupled to the insulator, wherein a plurality of power line lead-out holes are formed in the lower bracket so as to allow a power line extending from the stator coil to pass therethrough, and a plurality of air holes are formed in the circumferential direction between the respective power line lead-out holes so as to allow air to be suctioned toward the stator. Accordingly, a flow channel of air to for cooling a stator can be formed inside a stator slot, and thus cooling of the stator can be facilitated.

14 Claims, 14 Drawing Sheets

(51) Int. Cl.
    *H02K 5/22*         (2006.01)
    *H02K 7/08*         (2006.01)
    *H02K 9/06*         (2006.01)

(56) References Cited

U.S. PATENT DOCUMENTS

| | | | |
|---|---|---|---|
| 2018/0226857 A1* | 8/2018 | Ishizaki | F04D 29/668 |
| 2018/0266426 A1* | 9/2018 | Lee | F04D 29/5806 |
| 2018/0266438 A1 | 9/2018 | Hayamitsu | |
| 2019/0173349 A1* | 6/2019 | Smith | H02K 7/145 |

FOREIGN PATENT DOCUMENTS

| | | |
|---|---|---|
| JP | 2009-124772 A | 6/2009 |
| JP | 2018-129927 A | 8/2018 |
| JP | 2019-54671 A | 4/2019 |
| KR | 20-0152154 Y1 | 7/1999 |
| KR | 10-2019-0003259 A | 1/2019 |

\* cited by examiner

FAN MOTOR

CROSS REFERENCE TO RELATED APPLICATIONS

This application is the National Phase of PCT International Application No. PCT/KR2021/004039, filed on Apr. 1, 2021, which claims priority under 35 U.S.C. 119 (a) to Patent Application No. 10-2020-0101319, filed in the Republic of Korea on Aug. 12, 2020, all of which are hereby expressly incorporated by reference into the present application.

TECHNICAL FIELD

The present disclosure relates to a fan motor, and more particularly, to a lower bracket capable of defining an air flow path (channel) for cooling an inside of a fan motor.

BACKGROUND ART

A motor is a device that converts electrical energy into mechanical energy. Motors are used not only for general home appliances such as refrigerators, vacuum cleaners, hair dryers, and the like but also for operating vehicles.

Motors applied to general home appliances may be manufactured in various sizes and weights.

Recently, there is a trend toward miniaturization of home appliances. In particular, in the case of small home appliances such as hair dryers, it is essential to miniaturize parts (or components) applied.

Meanwhile, in a product such as a hair dryer, air volume and air speed generated by the hair dryer are involved in hair drying. That is, air volume and air speed may be important factors in determining performance of a product.

High-speed rotation of a motor is required to generate strong air speed and a large air volume. When the motor rotates at high speed, a lot of heat is also generated from the motor accordingly.

In particular, since small motors are more vulnerable to heat, heat dissipation may become a major issue.

Meanwhile, a motor includes a stator, a rotor, and a shaft. The motor has a structure in which the shaft connected to the rotor rotates while the rotor rotates by power applied to the stator.

In the case of a three-phase small motor, there is no space formed inside, which makes it difficult to dissipate heat. This causes a problem in that it is difficult to make a cooling passage.

Moreover, in order to maintain the same air volume and air pressure through such a small motor, a high-speed operation is required compared to a large motor. Accordingly, the small motor may generate more heat than the large motor.

In addition, in the case of a small three-phase motor, it is difficult to form a space inside the motor when the size is small. As a result, heat is most severely generated in a stator coil portion to which power is applied.

The related art discloses a stator coil cooling structure of a motor for a cleaner that is configured to increase cooling efficiency by concentrating intake air toward a stator coil (Korean Utility Model Registration No. 20-0152154).

The stator coil cooling structure disclosed in the related art relates to a DC motor, which facilitates securing of a cooling flow channel because of a sufficient space between wound coils.

However, in the case of a three-phase small motor of the present disclosure, it is difficult to create a cooling flow channel into a stator slot.

Therefore, it is necessary to study a fan motor in which a flow channel for cooling can be formed inside a stator slot of a three-phase small motor and a flow path structure of returning flow for cooling is improved.

PRIOR ART DOCUMENT (Patent Document 1) Korea Utility Model Registration No. 20-0152154

DISCLOSURE OF INVENTION

Technical Problem

One aspect of the present disclosure is to provide a fan motor having a structure in which a flow path (or flow channel) of air for cooling a stator is formed inside a stator slot.

Another aspect of the present disclosure is to provide a fan motor having an improved flow path structure of air for cooling a stator.

Still another aspect of the present disclosure is to provide a fan motor having a structure capable of minimizing flow loss of air for cooling a stator.

Still another aspect of the present disclosure is to provide a fan motor having a structure capable of directly cooling a coil by air.

Solution to Problem

To achieve those aspects and other advantages of the present disclosure, there is provided as fan motor that may include a housing, a vane hub accommodated in the housing, a stator mounted inside the vane hub and having a stator core, stator coils wound around the stator core, and an insulator insulating the stator core from the stator coils, a rotor rotatably installed inside the stator, a shaft coupled to the rotor to be rotatable, and a lower bracket coupled to the insulator. A plurality of power line lead-out holes may be formed through the lower bracket such that power lines extending from the stator coils are inserted therethrough, and a plurality of air holes may be formed through the lower bracket between the adjacent power line lead-out holes in a circumferential direction so that air is suctioned toward the stator.

A lower bearing may be coupled to one side of the shaft, and the lower bracket may include a body part formed in a hollow cylindrical shape, a lower bearing support part having a diameter smaller than that of the body part and surrounding and supporting the lower bearing, and a connection part connecting an inner surface of the body part and an outer surface of the lower bearing support part.

The air holes may be formed through the connection part at positions spaced apart by the same distance from a center of the lower bracket.

The air hole may be formed in an elliptical shape, and one side of the air hole may be bent toward a center of the lower bracket.

A mounting part may protrude from the body part in a direction to be coupled to the insulator, and the mounting part may be mounted in a mounting guide part formed as a recess from an outside of the insulator.

Heat dissipation holes may be formed through the vane hub such that air passing through the stator is discharged, and the heat dissipation holes may overlap the air holes in an up and down direction.

The lower bearing support part may include a first support surface supporting an outer circumferential surface of the lower bearing, and a second support surface supporting a bottom surface of the lower bearing, and a hole through which the shaft is inserted may be formed through the second support surface.

The air hole may be formed at a position corresponding to a space defined between the adjacent stator coils, so that suctioned air flows through the space defined between the stator coils.

A total cross-sectional area of the plurality of air holes may be equal to a total cross-sectional area of the plurality of heat dissipation holes, so as to reduce air resistance while the air flows into the stator.

The lower bracket may be made of an insulating member for insulation from the power lines extending from the stator coils.

The air holes may extend in a direction parallel to an extension direction of the shaft.

A plurality of air holes may be formed through between the adjacent power line lead-out holes in a circumferential direction so that air is suctioned toward the stator.

An upper bearing may be coupled to another side of the shaft, the upper bearing may be fixedly supported along an upper bearing support part formed inside the vane hub, and the lower bearing may be fixed by the lower bearing support part.

A fan motor according to another embodiment to achieve those aspects and other advantages of the present disclosure may include a housing, an outer vane hub accommodated in the housing, a stator mounted inside the vane hub and having a stator core, stator coils wound around the stator core, and an insulator insulating the stator core from the stator coils, and a lower bracket coupled to the insulator. The lower bracket may include a lower bearing support part surrounding and supporting a bearing coupled to one side of the shaft, and an insulator coupling part protruding from an outer surface of the lower bearing support part, and power line lead-out holes through which power lines extending from the stator coils are inserted may be formed through the insulator coupling part.

The lower bracket may be recessed at a position corresponding to a space defined between portions where the stator coils are wound, so that suctioned air flows into the space.

The lower bracket may be made of an insulating member for insulation from the power lines extending from the stator coils.

Advantageous Effects of Invention

According to one embodiment of the present disclosure, heat dissipation holes and air holes are formed through upper and lower sides of a stator to define air flow paths in hollow spaces defined between portions on which coils are wound, which can provide an effect of cooling an inside of stator slots.

In addition, according to another embodiment of the present disclosure, as heat dissipation holes and air holes are formed at positions corresponding to hollow spaces defined between adjacent stator coils, a structure of a flow path for cooling a stator can be formed straightly, which can provide an effect of improving a cooling effect.

In addition, according to another embodiment of the present disclosure, a heat dissipation hole and an air hole that constitute a flow path of air for cooling a stator can be formed to have the same area. This can reduce or minimize flow loss of air from a structure of a fan motor in which an area of the flow path does not change, thereby providing an effect of improving a cooling effect of the stator.

In addition, according to another embodiment of the present disclosure, a heat dissipation hole and an air hole may be formed at a position corresponding to a hollow space defined between stator slots. Through this, a flow path of air can be defined toward a coil where a lot of heat is generated, thereby improving a cooling effect.

MODE FOR THE INVENTION

Hereinafter, description will be given in more detail of a fan motor according to the present disclosure, with reference to the accompanying drawings. For the sake of brief description with reference to the drawings, the same or equivalent components will be provided with the same reference numbers, and description thereof will not be repeated. A singular representation used herein may include a plural representation unless it represents a definitely different meaning from the context.

In general, a suffix such as "module" and "unit" may be used to refer to elements or components. Use of such a suffix herein is merely intended to facilitate description of the specification, and the suffix itself is not intended to give any special meaning or function.

In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
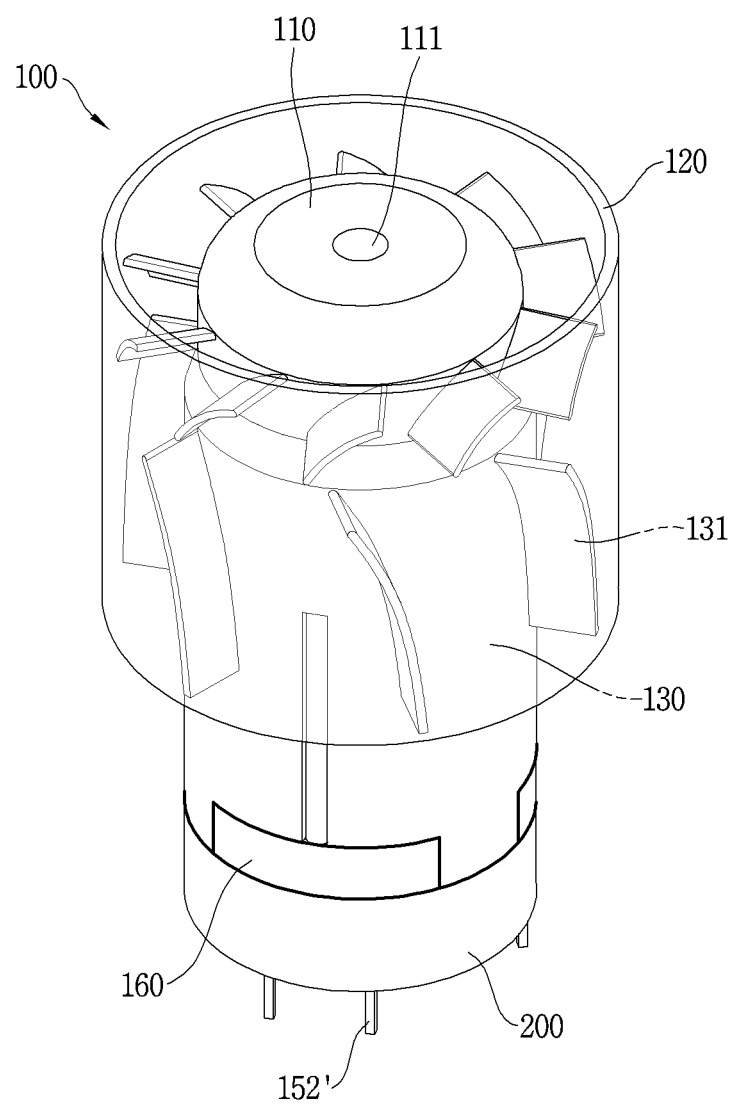
FIG. 1 is a perspective view illustrating a fan motor in accordance with one embodiment of the present disclosure.

FIG. 1 is a perspective view illustrating a fan motor 100 in accordance with one embodiment of the present disclosure.

Figure 2:
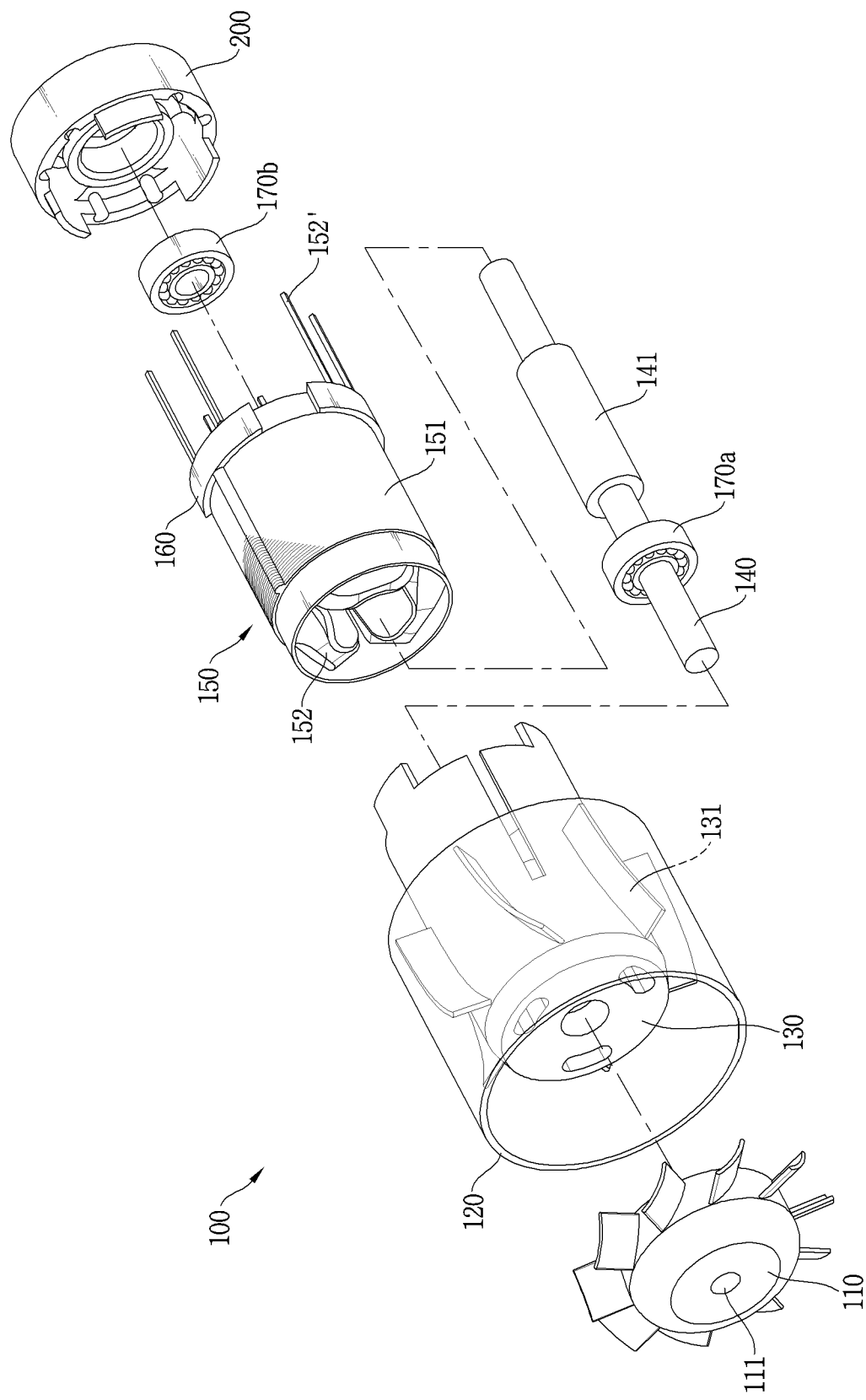
FIG. 2 is a perspective view illustrating a coupled state of components of the fan motor.

FIG. 2 is a perspective view illustrating a coupled state of components of the fan motor 100 of FIG. 1.

Hereinafter, a coupling relationship among components constituting the fan motor 100 and a structure thereof will be described in detail, with reference to FIGS. 1 and 2.

The fan motor 100 includes a housing 120, an impeller 110, a vane body 130, a stator, a shaft 140, and a lower bracket 200.

Vane wings 131 may be formed on an outer circumferential surface of the vane body 130 to facilitate the flow of air. The impeller 110 is coupled to one end of the shaft 140 and serves to generate wind while rotating. The impeller 110 may be disposed on an outer upper portion of the vane body 130.

The impeller 110 and a portion of the vane body 130 may be accommodated in the housing 120. For example, a portion of the vane body 130 on which the vane wings 131 are disposed may be accommodated inside the housing 120. That is, a portion of the vane body 130 may be disposed to protrude to the outside of the housing 120.

The portion of the vane body 130 that protrudes to the outside may be formed in an open shape such that a stator assembly 150 to be described later is to be accommodated therein. That is, a space in which an upper bearing 170a and the stator are to be accommodated may be defined inside the vane body 130.

Meanwhile, the stator includes a stator core 151 and a stator coil 152 wound around the stator core 151. An insulator 160 for insulation may be mounted on an outer circumferential surface of the stator to constitute the stator assembly 150.

The stator core 151 is formed by overlapping electrical steel sheets. That is, the stator core 151 may be formed by stacking a plurality of electrical steel sheets.

The stator coil 152 is coupled to be wound around the stator core 151 multiple times.

In addition, an accommodation space for the rotor 141 in which the rotor 141 is to be accommodated is secured inside the stator core 151. The rotor 141 serves to convert electromagnetic energy into mechanical work, and is a portion that is responsible for rotation in the motor.

Meanwhile, the shaft 140 includes a rotor 141 and a bearing part 170, and the bearing part 170 includes an upper bearing 170a, and a lower bearing 170b.

The rotor 141 may be disposed on an outer circumferential surface of the shaft 140. A portion where the rotor 141 is installed may be accommodated in the space defined inside the stator core 151 described above.

In addition, the shaft 140 is formed in a shape extending in a longitudinal (lengthwise) direction. The shaft 140 may be inserted through the stator core 151 and thus a length of the shaft 140 may be longer than a length of the stator core 151. That is, the shaft 140 may protrude from both sides of the stator core 151.

The upper bearing 170a and the lower bearing 170b may be disposed on portions of the shaft 140 that protrude to the both sides of the stator core 151. The upper bearing 170a may be disposed on an upper portion of the shaft 140 and the lower bearing 170b may be disposed on a lower portion of the shaft 140. The shaft 140 can be stably rotated by the bearing part 170 installed on the both sides of the shaft 140.

Meanwhile, a stator assembly 150 may be disposed inside the vane body 130. An extended portion of the stator coil 152 that is wound around the stator core 151 may be drawn out through the insulator 160.

Here, the extended portion of the stator coil 152 may mean a power line 152'.

In addition, the power line 152' may be drawn out through the lower bracket 200 that is mounted on the insulator 160. External power may be applied through an end of the power line 152'. The applied power may be transferred to the stator coil 152, which is wound around the stator core 151, through the power line 152'.

When power reaches the stator coil 152, a magnetic field may be produced by the stator coil 152 inside the stator core 151. The rotor 141 accommodated in the stator core 151 may rotate by interaction with the magnetic field.

When the rotor 141 rotates, the shaft 140 connected to the rotor 141 may rotate. When the impeller 110 is rotated by the rotation of the shaft 140, wind may be generated.

For example, in the case of a product such as a hair dryer, wind generated by the impeller 110 may mean wind for drying hair.

When stronger air volume and high air speed are generated by the product such as the hair dryer, hair drying can be more facilitated. That is, air volume and air speed may be factors that influence the performance of the product such as the hair dryer.

Meanwhile, high-speed rotation of the impeller 110 is required in order to increase the air volume and speed. That is, while the impeller 110 rotates at a high speed according to the high-speed rotation of the shaft 140, the air volume can be increased for the same time.

Since a problem of dissipating heat generated by the high-speed rotation of the motor is on the rise, a motor cooling problem, which will be described later, may always be dealt with as an important issue in the design of the motor.

Figure 3:
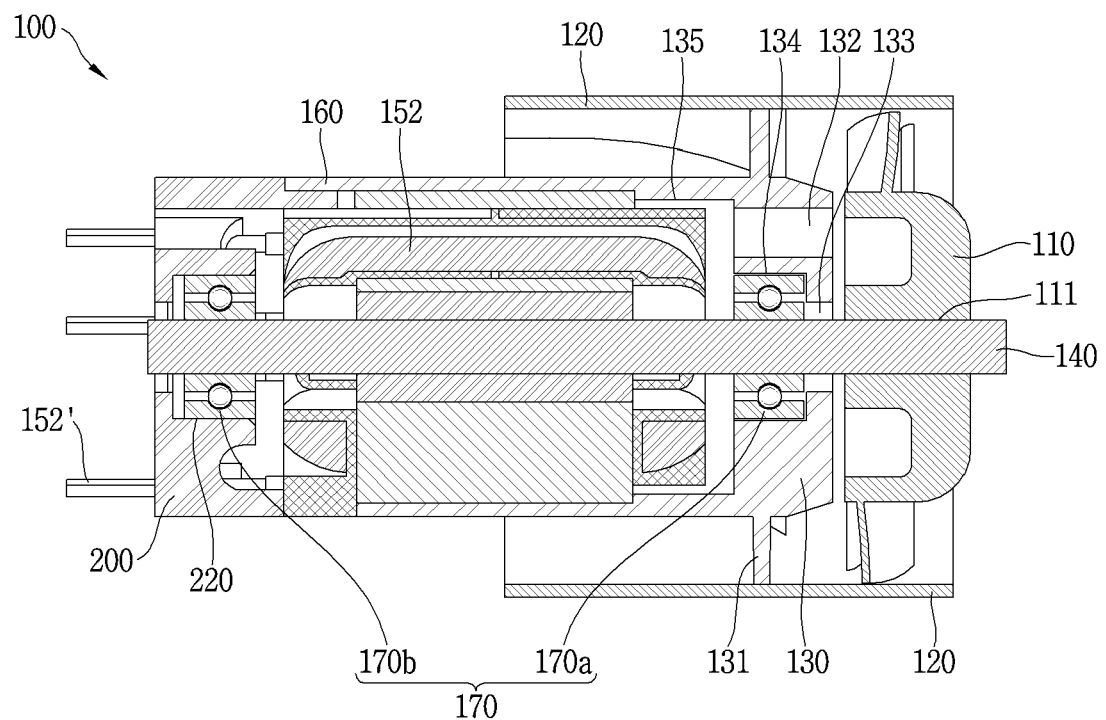
FIG. 3 is a sectional view of the fan motor.

FIG. 3 is a sectional view illustrating the fan motor 100 of FIG. 1.

Hereinafter, the order of coupling parts of the fan motor 100 and the arrangement of the parts will be described, with reference to FIGS. 2 and 3.

The fan motor 100 has a structure in which other components are coupled to the outside of the shaft 140.

First, the rotor 141 may be coupled to a central portion of the shaft 140. Also, the bearing part 170 may be coupled to both sides of the shaft 140. The shaft 140 coupled with the rotor 141 and the bearing part 170 may be accommodated in a space defined inside the stator core 151.

Here, a portion of the shaft 140 which is accommodated in the space defined inside the stator core 151 may be a portion to which the rotor 141 is coupled.

The portion of the shaft 140 to which the rotor 141 and the bearing part 170 are coupled is preferably accommodated after the stator coil 152 is wound around the stator core 151.

Afterwards, the stator and the shaft 140 may be inserted into an inner space of the vane body 130.

First, one end of the shaft 140 may be inserted through a first shaft through-hole 133 that is formed through the vane body 130. After the shaft 140 is inserted through the first shaft through-hole 133, the impeller 110 may be coupled to the one end of the shaft 140.

Then, the upper bearing 170a is seated on an upper bearing support part 134 formed inside the vane body 130.

At the same time, the stator assembly 150 may be coupled to a stator accommodating portion 135 formed inside the vane body 130.

Finally, the lower bracket 200 may be coupled toward a lower portion of the fan motor 100. In this case, the lower portion of the shaft 140 may pass through a second shaft through-hole formed through the lower bracket 200.

Then, the lower bearing 170b may be seated on a lower bearing support part. At the same time, the power line 152' may be coupled through a power line lead-out hole 240.

Figure 4A:
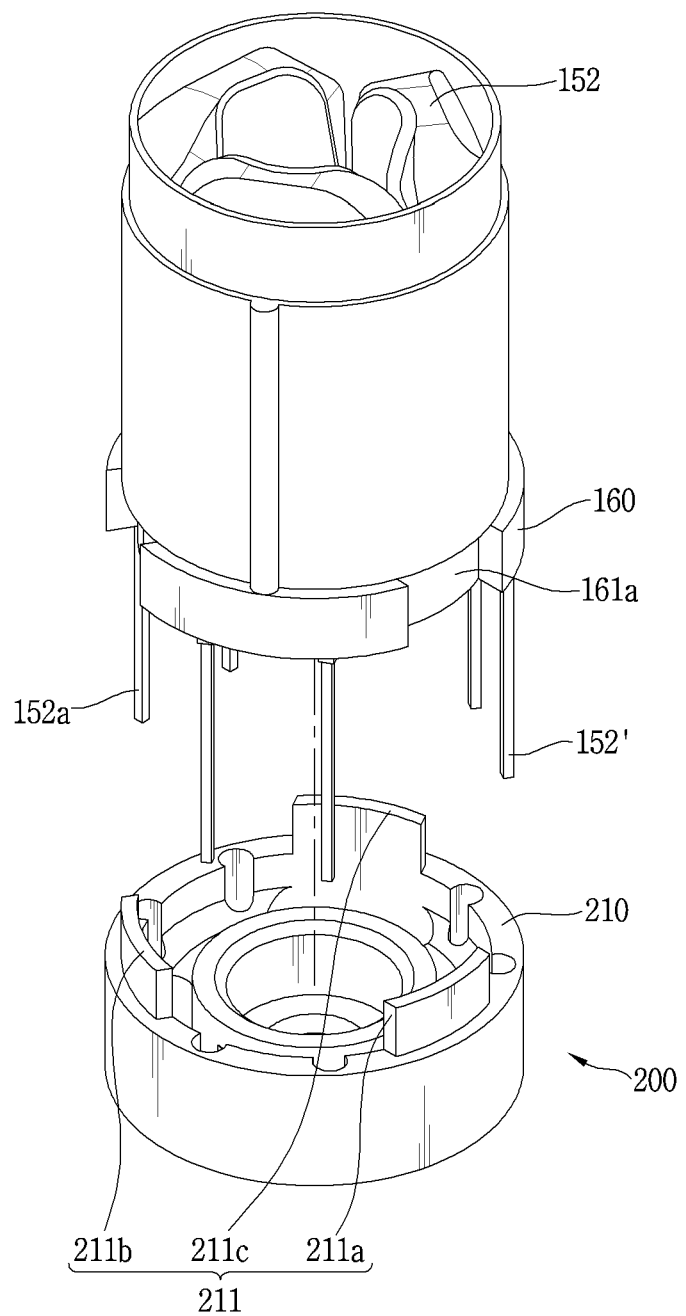
FIG. 4A is a conceptual view illustrating a state in which a lower bracket and an insulator are coupled by a mounting part formed on the lower bracket and a mounting guide part formed on the insulator.

FIG. 4A is a conceptual view illustrating a state in which the lower bracket 200 and the insulator 160 are coupled by a mounting part 211 formed on the lower bracket 200 and a mounting guide part 161 formed on the insulator 160.

Figure 4B:
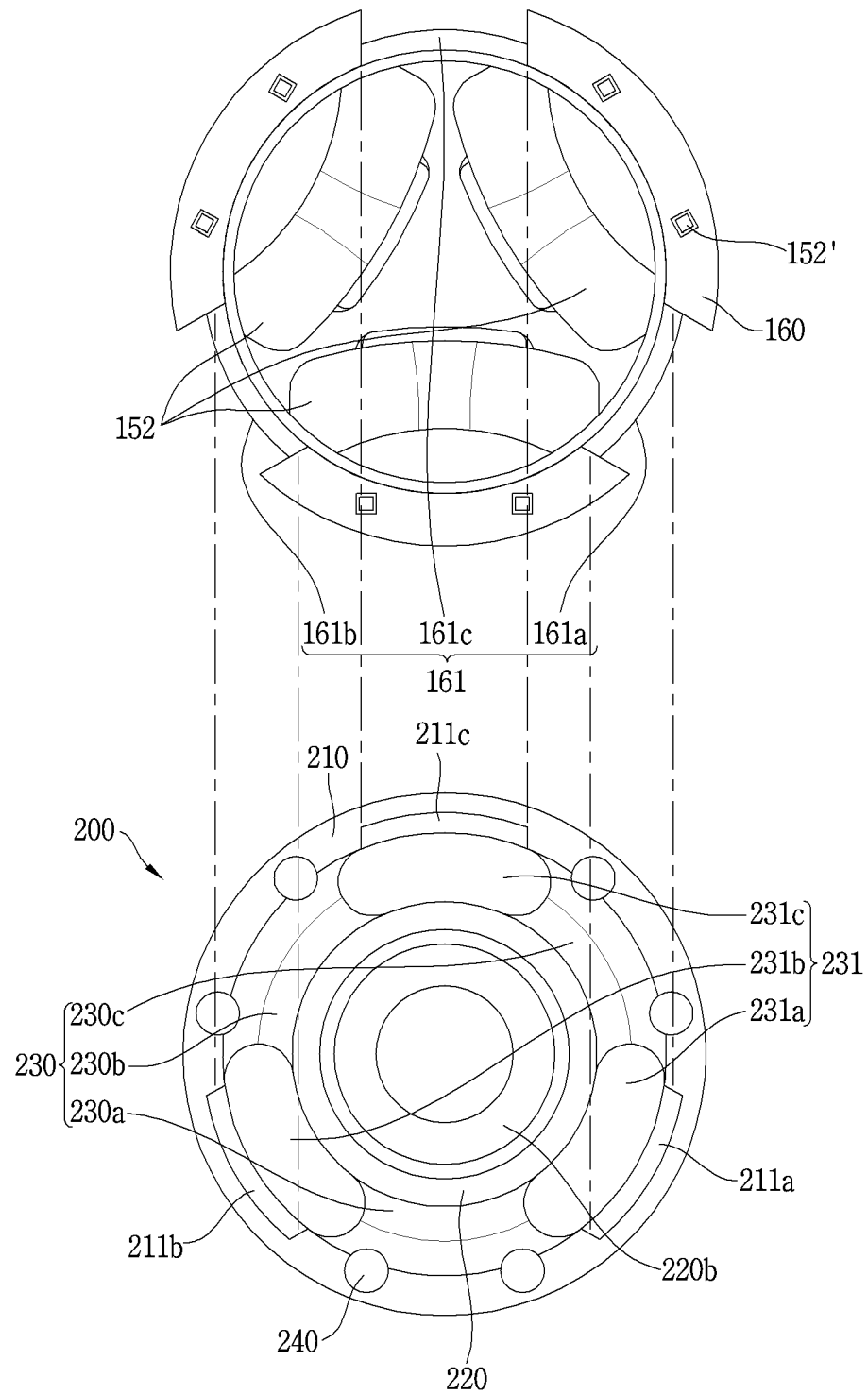
FIG. 4B illustrates a planar view of the lower bracket and a bottom view of an insulator assembly.

FIG. 4B illustrates a planar view of the lower bracket 200 and a bottom view of an insulator assembly 150.

Hereinafter, a process of coupling the insulator 160 and the lower bracket 200 will be described in detail, with reference to FIGS. 4A and 4B.

As described above, the insulator 160 is installed on the outer circumferential surface of the stator core 151 to insulate the stator core 151.

Also, the extended portion of the stator coil 152 may pass through the insulator 160. That is, the power line 152' may be drawn out through the insulator 160.

Power applied from the outside flows to the stator coil 152 along the power line 152'.

Meanwhile, the power line lead-out hole 240 through which a plurality of power lines 152' can pass may be formed through the lower bracket 200.

As described above, since current flows along the power line 152', the lower bracket 200 must be configured as an insulator for insulation. For example, the lower bracket 200 may be made of a member such as plastic on which current does not flow.

Meanwhile, a groove may be recessed into one side of the insulator 160 formed on a lower portion of the stator assembly 150. Here, the groove may mean a mounting guide part 161.

On the other hand, a mounting part 211 may protrude from a body part 210 of the lower bracket 200.

The mounting part 211 may have a shape corresponding to the mounting guide part 161. In order to fix the lower bracket 200 and the insulator 160, the mounting part 211 is preferably formed to correspond to the shape of the mounting guide part 161.

In addition, the mounting part 211 may be formed to be curved in a circumferential direction based on the center of the lower bracket 200. That is, when a first mounting portion 211a, a second mounting portion 211b, and a third mounting portion 211c that constitute the mounting part 211 are connected in the circumferential direction, the shape may be circular.

In addition, the mounting part 211 may be radially disposed along the circumferential direction.

The first mounting portion 211a, the second mounting portion 211b, and the third mounting portion 211c may be mounted respectively to a first mounting guide portion 161a, a second mounting guide portion 161b, and a third mounting guide portion 161c that constitute the mounting guide part 161.

As will be described later, the mounting part 211 and the mounting guide part 161 may be formed on the lower bracket 200 and the insulator 160 at predetermined angles, respectively. Thus, the relationship in which the mounting part 211 is seated on the mounting guide part 161 may not be limited to the aforementioned relationship.

In addition, the mounting part 211 may be seated while sliding along the mounting guide part 161. For example, the mounting part 211 may be installed on the mounting guide part 161 while the lower bracket 200 is directed toward the insulator 160.

In this case, when the first mounting portion 211a is slid into one mounting guide portion of the mounting guide part 161, the second mounting portion 211b and the third mounting portion 211c may be seated without needing to adjust their positions separately.

Figure 5:
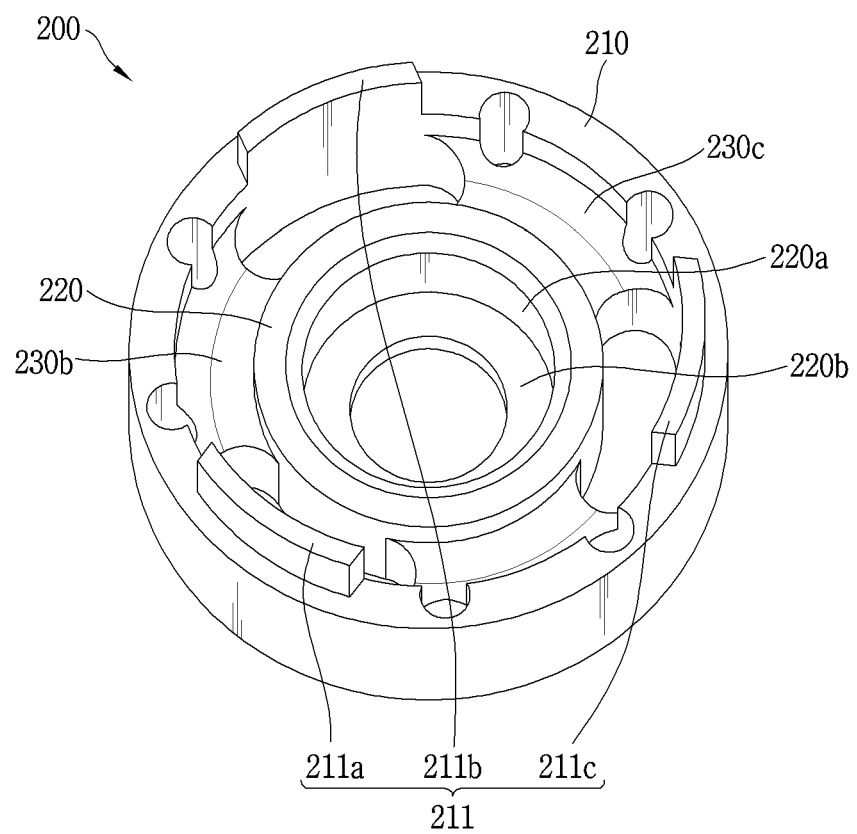
FIG. 5 is a perspective view illustrating the lower bracket, which is one component of the fan motor.

FIG. 5 is a perspective view illustrating the lower bracket 200, which is one component of the fan motor 100.

The lower bracket 200 includes a body part 210, a lower bearing support part, and a connection part 230.

The body part 210 may be formed in a hollow cylindrical shape.

The lower bearing support part is formed in a hollow cylindrical shape having a diameter smaller than that of the body part 210, and encloses the lower bearing 170b installed on one side of the shaft 140.

The connection part 230 connects an inner surface of the body part 210 and an outer surface of the lower bearing support part.

As described above, the plurality of mounting portions 211a, 211b, and 211c may protrude from the body part 210 toward the insulator 160.

Power line lead-out holes 240 through which a plurality of power lines 152' can pass may be formed through the lower bracket 200. The power line lead-out holes 240 may be formed through a boundary between the body part 210 and the connection part 230.

Meanwhile, air holes 231 may be formed through the lower bracket 200 to allow air to be suctioned into the stator.

The air holes 231 (231a, 231b, 231c) may be formed along the circumferential direction between the adjacent power line lead-out holes 240. Here, the position where the air hole 231 is formed may correspond to the position where the mounting part 211 is formed.

Since the mounting part 211 is formed toward a space between the stator coils 152, the air hole 231 defining a flow path (flow channel) between the stator coils 152 is also preferably formed at the position where the mounting part 211 is formed.

Meanwhile, the lower bearing support part may be formed in a shape in which the lower bearing 170b in the cylindrical shape can be accommodated.

An inner surface of a portion of the lower bearing support part where the lower bearing 170b is accommodated includes a first support surface 220a and a second support surface 220b. The first support surface 220a is a surface supporting an outer surface of the lower bearing 170b. The second support surface 220b is a surface supporting a bottom surface of the lower bearing 170b.

The first support surface 220a may include a second shaft through-hole through which the shaft 140 can be inserted. The second shaft through-hole may have a diameter smaller than that of the bearing support part.

Figure 6:
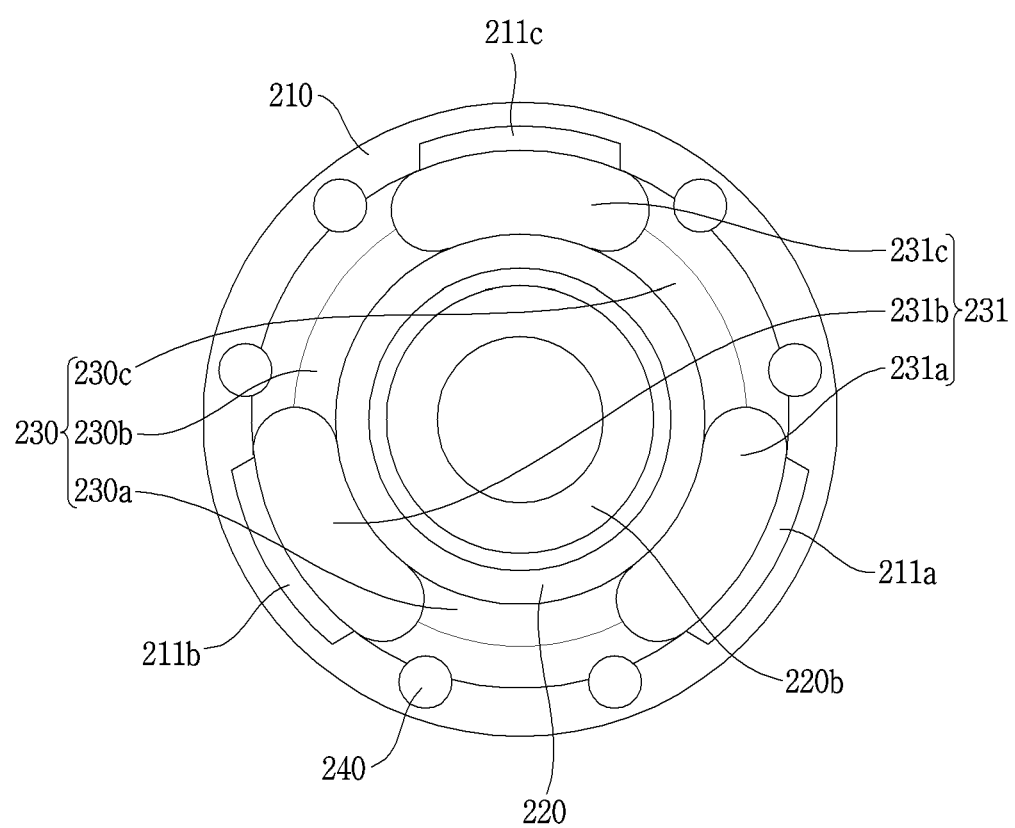
FIG. 6 is a planar view of the lower bracket.

FIG. 6 is a planar view of the lower bracket 200.

A specific shape of the air hole 231 will be described in detail with reference to FIG. 6.

A plurality of air holes 231 are formed through the lower bracket 200 to allow air to be suctioned into the stator. The plurality of air holes 231 may include a first air hole 231a, a second air hole 231b, and a third air hole 231c.

The plurality of air holes 231 may be formed through the connection part 230. In other words, the plurality of air holes 231 may be formed between the body part 210 and the lower bearing support part.

It can be understood that the plurality of air holes 231 are formed in the circumferential direction based on the center of the lower bracket 200.

Meanwhile, the shape of the air hole 231 may be elliptical. The elliptical shape may be bent (curved) toward the center of the lower bracket 200.

In detail, a virtual major axis formed inside the elliptical shape may be set.

The major axis may have the same radius based on the center of the lower bracket 200. That is, the major axis may have an arcuate shape based on the center of the lower bracket 200.

The elliptical shape may be rounded along the major axis.

Figure 7:
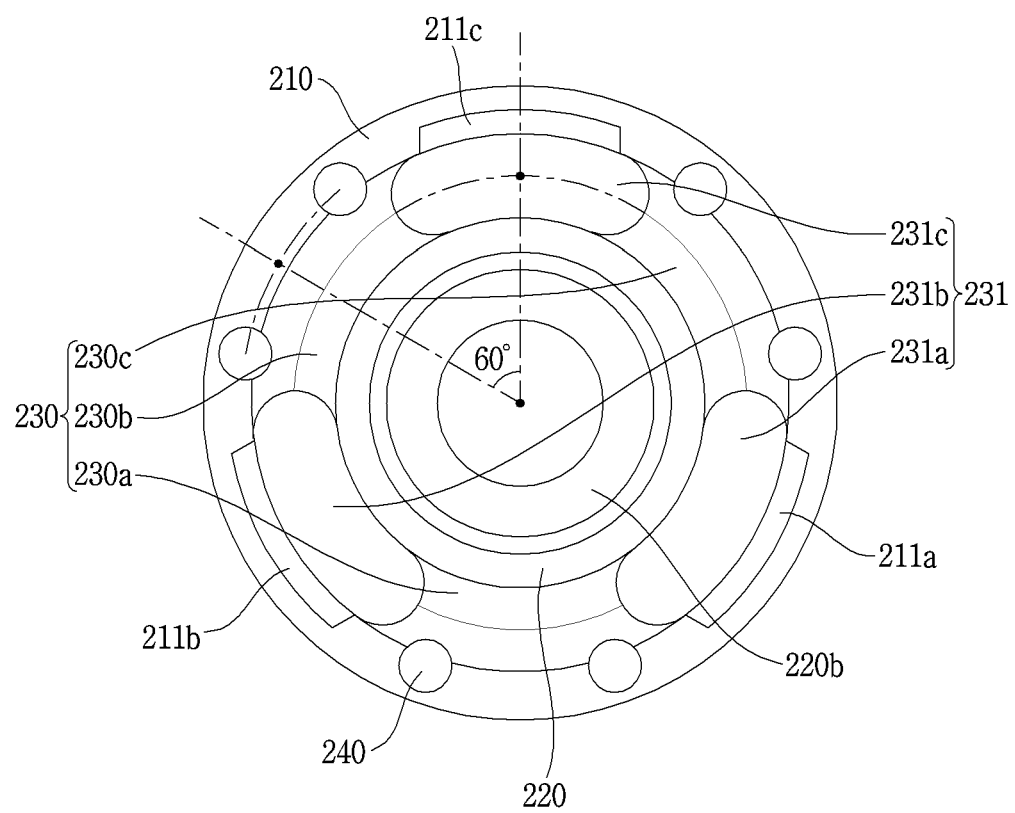
FIG. 7 is a conceptual view illustrating an arrangement between an air hole formed in the lower bracket and a power cable lead-out hole.

FIG. 7 is a conceptual view illustrating an arrangement between the air holes 231 and the power line lead-out holes 240 formed through the lower bracket 200.

Hereinafter, the arrangement between the power line lead-out holes 240 and the air holes 231 formed through the lower bracket 200 will be described in detail, with reference to FIG. 7.

As illustrated in FIG. 2, the fan motor 100 is configured as a three-phase motor. Therefore, the stator coils 152 may be wound around three places of the stator core 151. That is, the stator coils 152 may be wound at angles of 120 degrees based on the center of the stator.

As the portions where the stator coils 152 are wound are set at the angles of 120 degrees, the spaces between the adjacent stator coils 152 may also be formed at the angles of 120 degrees.

As described above, the air holes 231 may be formed to correspond to the spaces defined between the adjacent stator coils 152.

That is, the three air holes 231 may be disposed along the circumferential direction at the angles of 120 degrees based on the center of the lower bracket 200.

A middle point between the adjacent power line lead-out holes 240 and a center point of the air hole 231 may form an angle of 60 degrees with respect to the center of the lower bracket 200.

The power line lead-out holes 240 may be disposed along the circumferential direction in a manner that the middle points between the adjacent power line lead-out holes 240 form an angle of 120 degrees therebetween based on the center of the lower bracket 200.

Figure 8:
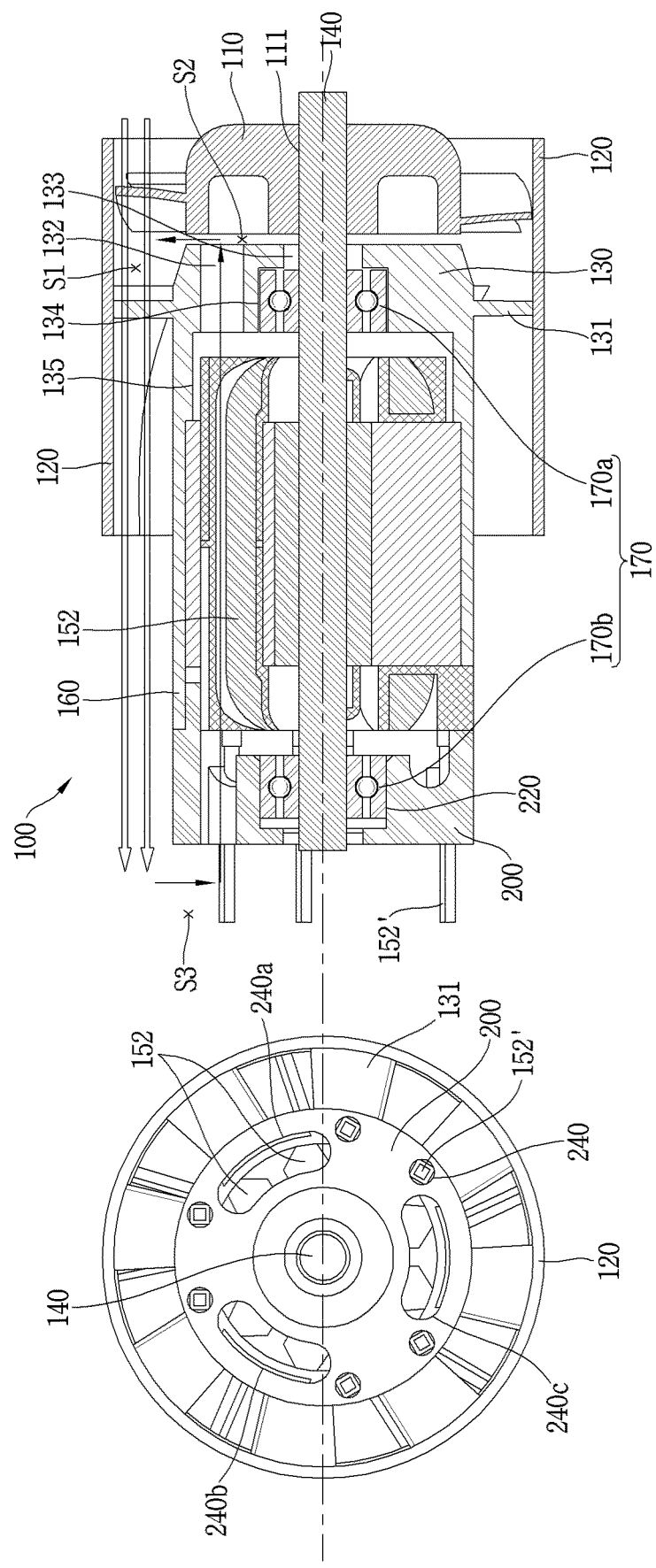
FIG. 8 is a conceptual view illustrating returning flow formed in the fan motor.

FIG. 8 is a conceptual view illustrating returning flow formed in the fan motor 100.

Hereinafter, a flow path structure of the returning flow formed in the fan motor 100 will be described in detail with reference to FIG. 8.

Here, a returning flow refers to a phenomenon in which a flow of air changes its direction such that the air flows backward.

A flow path (flow channel) through which air (wind) generated by the impeller 110 moves defines a main flow path. That is, a flow path through which the air generated by the impeller 110 is emitted to the outside via a gap between the vane body 130 and the housing 120 becomes the main flow path.

On the other hand, a flow path through which air suctioned through the air holes 231 flows along heat dissipation holes 132 (132a, 132b, 132c) via the inside of the stator defines an inner flow path.

The returning flow formed by the main flow path and the inner flow path using Bernoulli's law will be described in detail.

Referring to FIG. 8, a main flow path upper point S1 is a point where air is generated by the impeller 110, namely, a fast flow is made. That is, the main flow path upper point S1 is a point where dynamic pressure is greatly applied.

Here, the dynamic pressure refers to pressure involved in speed of a flow, of total pressure made by a fluid. That is, as the speed of the fluid increases, the dynamic pressure increases.

When the dynamic pressure rises at the main flow path upper point S1, static pressure decreases according to Bernoulli's law. Here, the static pressure refers to pressure that acts in a direction perpendicular to a flow of a fluid when the fluid flows in a pipe.

Dynamic pressure may be obtained by subtracting static pressure from total pressure by applying Bernoulli's law (conservation of energy). In relationship between static pressure and dynamic pressure, high static pressure and low dynamic pressure are observed in a flow path in which a flow rate is low, and high dynamic pressure and low static pressure are observed in a flow path in which a flow rate is high.

Since an inner flow path upper point S2 is located on the same line as the main flow path upper point S1, when the static pressure of the main flow path decreases, the static pressure of the inner flow path upper point S2 may also decrease.

Meanwhile, a fan motor external point means a point of an outside of the fan motor 100 which is located on one line as the inner flow path upper point S2 in an up and down direction.

The fan motor external point is a point on which atmospheric pressure acts at the outside of the fan motor 100. Therefore, the fan motor external point is subject to high pressure, compared to the inner flow path upper point S2 in which pressure is decreased by the main flow path.

Since the flow of air is made from a point with high pressure to a point with low pressure, the flow in the inner flow path is made from the fan motor external point to the inner flow path upper point S2.

As described above, air may be suctioned through the air holes 231 and flow toward an upper portion of the inner flow path. The air that flows upward may collide with a lower portion of the impeller 110 and may be introduced into a space defined between the impeller 110 and the vane body 130.

When the air flows out of the space, it joins the main flow path. That is, the wind (or air) generated in the main flow path may move toward the fan motor external point, and then move to the inner flow path upper point from the fan motor external point. As the air moves from the inner flow path upper point S2 to the main flow path upper point S1, the structure of the returning flow is completely created.

By forming the air holes 231 at the positions corresponding to the spaces between the adjacent wound stator coils 152, the stator coils 152 from which the most heat is generated can be directly cooled.

As the flow path structure of the returning flow as described above is produced, air for cooling can move inside the small three-phase motor.

Figure 9:
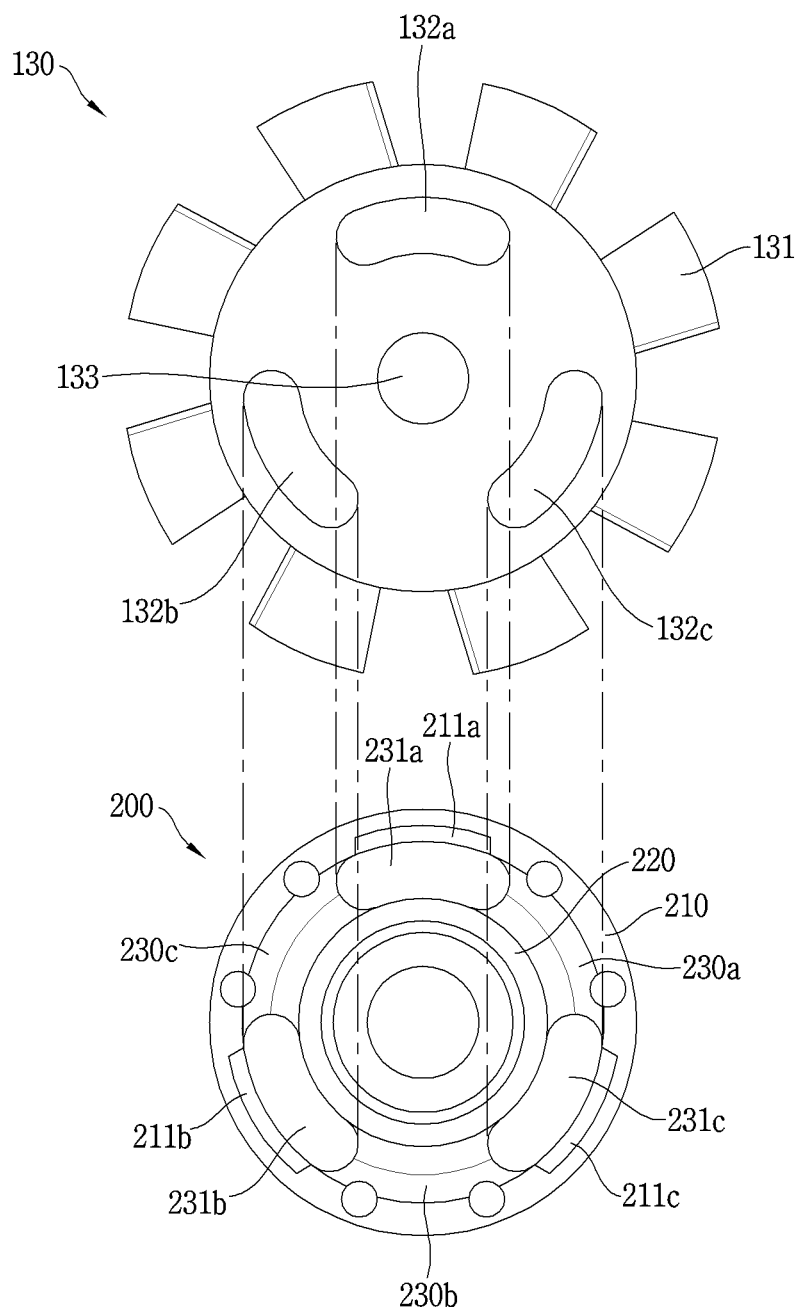
FIG. 9 is a planar view of a vane body and the lower racket.

FIG. 9 is a planar view of the vane body 130 and the lower racket 200.

As described above, the heat dissipation holes 132 formed through the vane body 130 and the air holes 231 formed through the lower bracket 200 may define the inner flow path.

The plurality of heat dissipation holes 132 (132a, 132b, 132c) may be formed through an upper portion of the vane body 130. The plurality of heat dissipation holes 132 may include a first heat dissipation hole 132a, a second heat dissipation hole 132b, and a third heat dissipation hole 132c.

According to Bernoulli's law, the speed of a fluid may change when an area of a flow path decreases or increases. Accordingly, in order to reduce or minimize flow loss in a flow path in which a fluid flows, the flow path preferably has a constant area.

Therefore, the flow loss of the fluid moving in the flow path can be reduced or minimized by matching a total cross-sectional area of the plurality of air holes 231 and a total cross-sectional area of the plurality of heat dissipation holes 132.

As illustrated in FIG. 9, the air holes 231 and the heat dissipation holes 132 are arranged to overlap each other in the up and down (vertical) direction. Accordingly, the heat dissipation hole 132 and the air hole 231 that are formed at corresponding positions to each other may have the same area.

Unlike the case where the total cross-sectional area of the plurality of air holes 231 and the total cross-sectional area of the plurality of heat dissipation holes 132 are equal to each other, a cross-sectional area of the air hole 231 and a cross-sectional area of the heat dissipation hole 132 that are formed at the corresponding positions to each other may be equal to each other.

With respect to each flow path formed inside the stator, the air hole 231 and the heat dissipation hole 132 formed at the corresponding positions to each other may preferably have the same cross-sectional area.

That is, the first air hole 231a, the second air hole 231b, and the third air hole 231c may be formed at positions corresponding to the first heat dissipation hole 132a, the second heat dissipation hole 132b, and the third heat dissipation hole 132c, respectively.

According to this structure, air passing through the plurality of air holes 231a, 231b, and 231c can flow along the inside of the stator assembly 150.

Here, the inside of the stator assembly 150 may mean spaces formed between the adjacent stator coils 152.

The air passing through the inside of the stator assembly 150 may pass through the plurality of heat dissipation holes 132a, 132b, and 132c. Such an air flow path may indicate the inner flow path described in FIG. 8.

Since the plurality of air holes 231a, 231b, and 231c and the plurality of heat dissipation holes 132a, 132b, and 132c are formed at corresponding positions to each other along the vertical direction, the inner flow path may have a straight structure.

Since the inner flow path is formed in the form of the straight line, the flow loss of the returning flow can be reduced or minimized. Through this, an increase in a cooling effect of the fan motor 100 can be expected.

In addition, it is more preferable that the cross-sectional area of each of the air hole 231 and the heat dissipation hole 132 is equal to a cross-sectional area of the space defined between the adjacent wound stator coils 152.

FIG. 9 illustrates the three air holes 231 and the three heat dissipation holes 132, but the number may alternatively be more than three.

Figure 10:
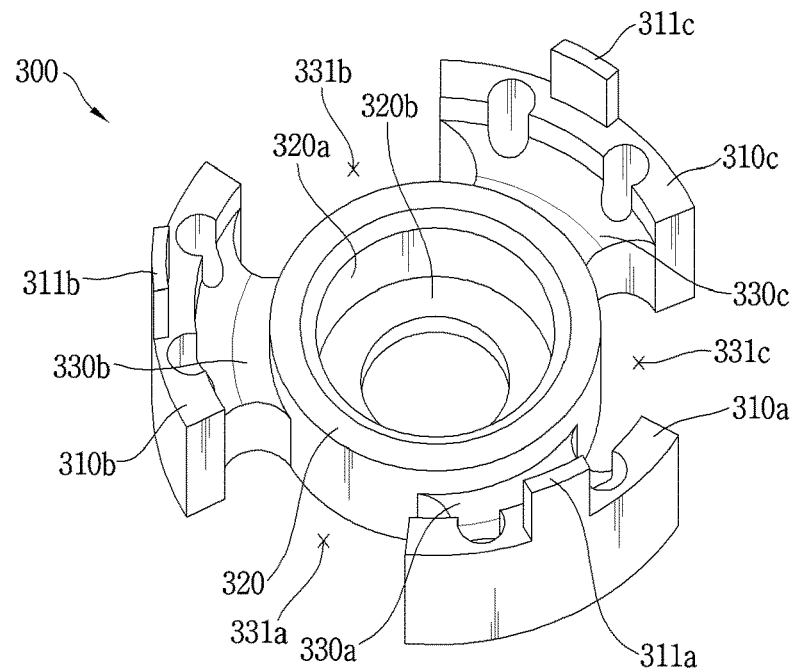
FIG. 10 is a perspective view illustrating a lower bracket 200 having another shape according to the present disclosure.

FIG. 10 is a perspective view illustrating a lower bracket 200 having another shape according to the present disclosure.

Figure 11:
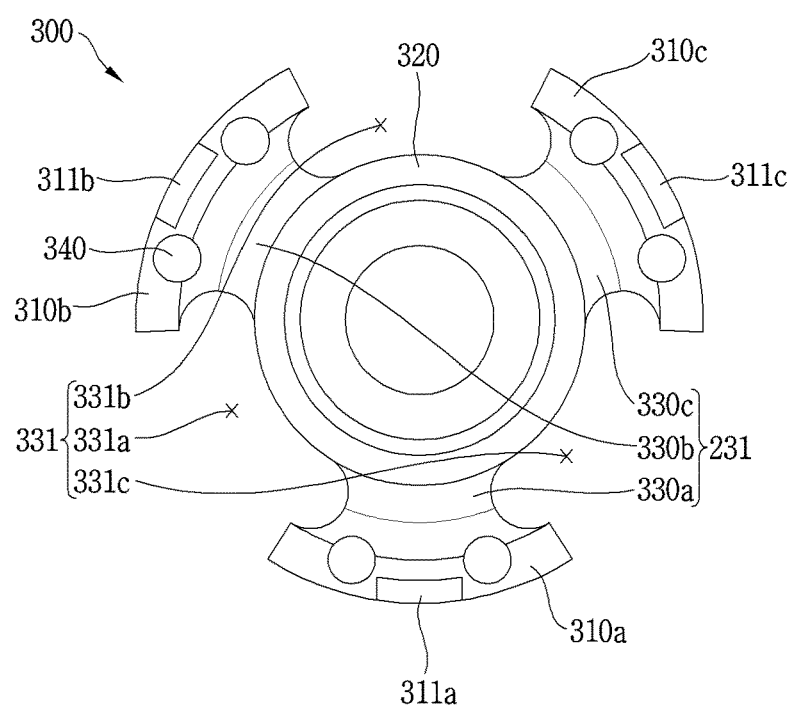
FIG. 11 is a planar view of the lower bracket 200 having the another shape.

FIG. 11 is a planar view of the lower bracket 200 having the another shape. Hereinafter, the lower bracket 200 having another shape according to the present disclosure will be described in detail with reference to FIGS. 10 and 11.

A lower bracket 300 having another shape illustrated in FIG. 10 includes an insulator coupling part 310, a lower bearing support part 320, and a connection part 330.

The lower bearing support part 320 may be formed in a shape in which the lower bearing 170b in the cylindrical shape can be accommodated.

An inner surface of a portion of the lower bearing support part where the lower bearing 170b is accommodated includes a first support surface 320a and a second support surface 320b. The first support surface 320a is a surface supporting an outer surface of the lower bearing 170b. The second support surface 320b is a surface supporting a bottom surface of the lower bearing 170b.

Here, the bottom surface of the lower bearing 170b may mean a lower surface when a portion where the impeller 110 is disposed is assumed to be an upper side.

The first support surface 320a may include a second shaft through-hole 321 through which the shaft 140 can be inserted. The second shaft through-hole 321 may have a diameter smaller than that of the bearing support part.

The connection part 330 protrudes radially from an outer surface of the lower bearing support part 320.

As illustrated in FIG. 10, the connection part 330 may protrude in three directions. The protruding directions may correspond to directions in which the stator coils 152 are wound around the stator core 151.

The connection part 330 may include a plurality of connection portions, namely, a first connection portion 330a, a second connection portion 330b, and a third connection portion 330c.

The insulator coupling part 310 is formed on one end of the connection part 330 in a shape corresponding to that of the insulator 160.

A first insulator coupling portion 310a of the insulator coupling part 310 may be formed on one end of the first connection portion 330a.

A second insulator coupling portion 310b may be formed on one end of the second connection portion 330b.

A third insulator coupling portion 310c may be formed on one end of the third connection portion 330c.

An air inlet part 331 may be formed between the adjacent connection portions 330a, 330b, and 330c.

Referring to FIG. 10, a first air inlet 331a may be formed between the first connection portion 330a and the second connection portion 330b, and a second air inlet 331b may be formed between the second connection portion 330b and the third connection portion 330c, and a third air inlet 331c may be formed between the third connection portion 330c and the first connection portion 330a.

From another point of view, the air inlet part 331 may be recessed into an outer circumferential surface of the insulator coupling part 310 toward the center. That is, the air inlet part 331 may be formed at the recessed portion.

Meanwhile, the air inlet part 331 is a portion through which air is introduced from the outside of the fan motor 100. Air introduced through the air inlet part 331 can flow through the heat dissipation hole 132 via the space between the stator coils 152.

Also, a plurality of power line lead-out holes 340 through which the plurality of power lines 152' extending from the stator coils 152 can be drawn out may be formed through the lower bracket 300.

The plurality of power line lead-out holes 340 may be formed through a boundary between the insulator coupling part 310 and the connection part 330 that are adjacent to each other.

The plurality of power line lead-out holes 340 may be formed in the circumferential direction based on the center of the lower bracket 300. In addition, the plurality of power line lead-out holes 340 may be radially arranged.

In addition, a mounting part 311 may be formed between the adjacent power line lead-out holes 340.

Figure 12A:
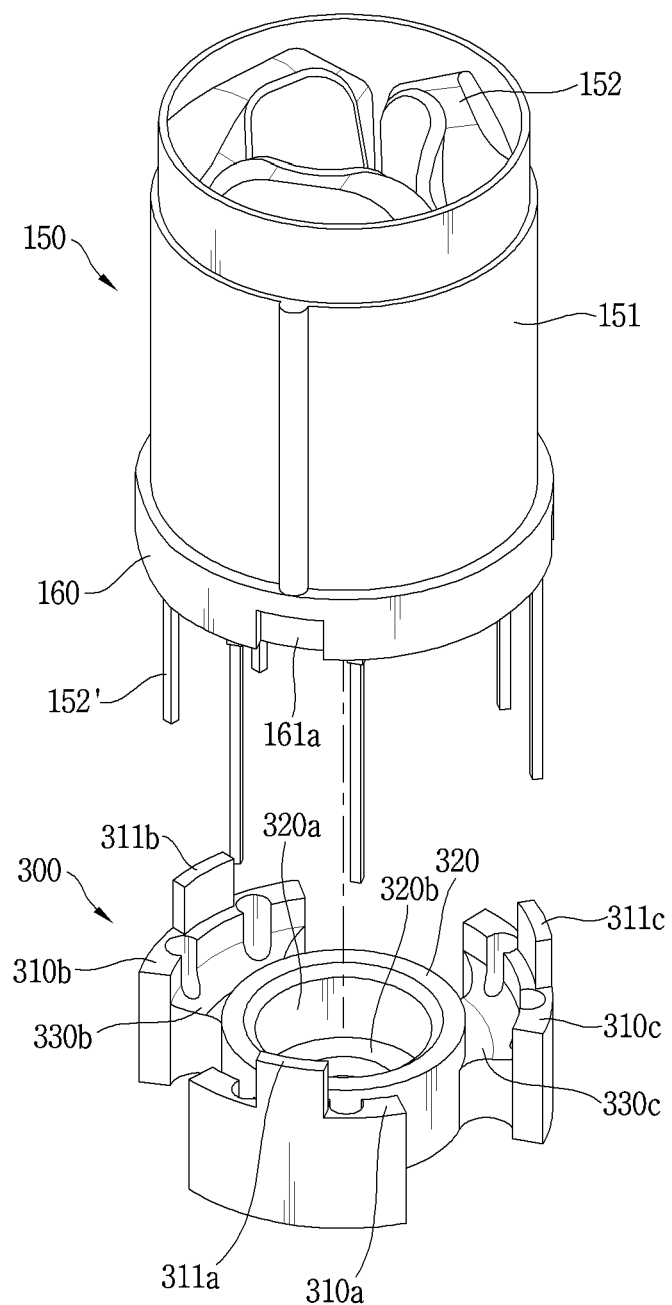
FIG. 12A is a conceptual view illustrating a state in which the lower bracket having the another shape is mounted on the insulator.

FIG. 12A is a conceptual view illustrating a state in which the lower bracket 300 having the another shape is mounted on the insulator 160.

Figure 12B:
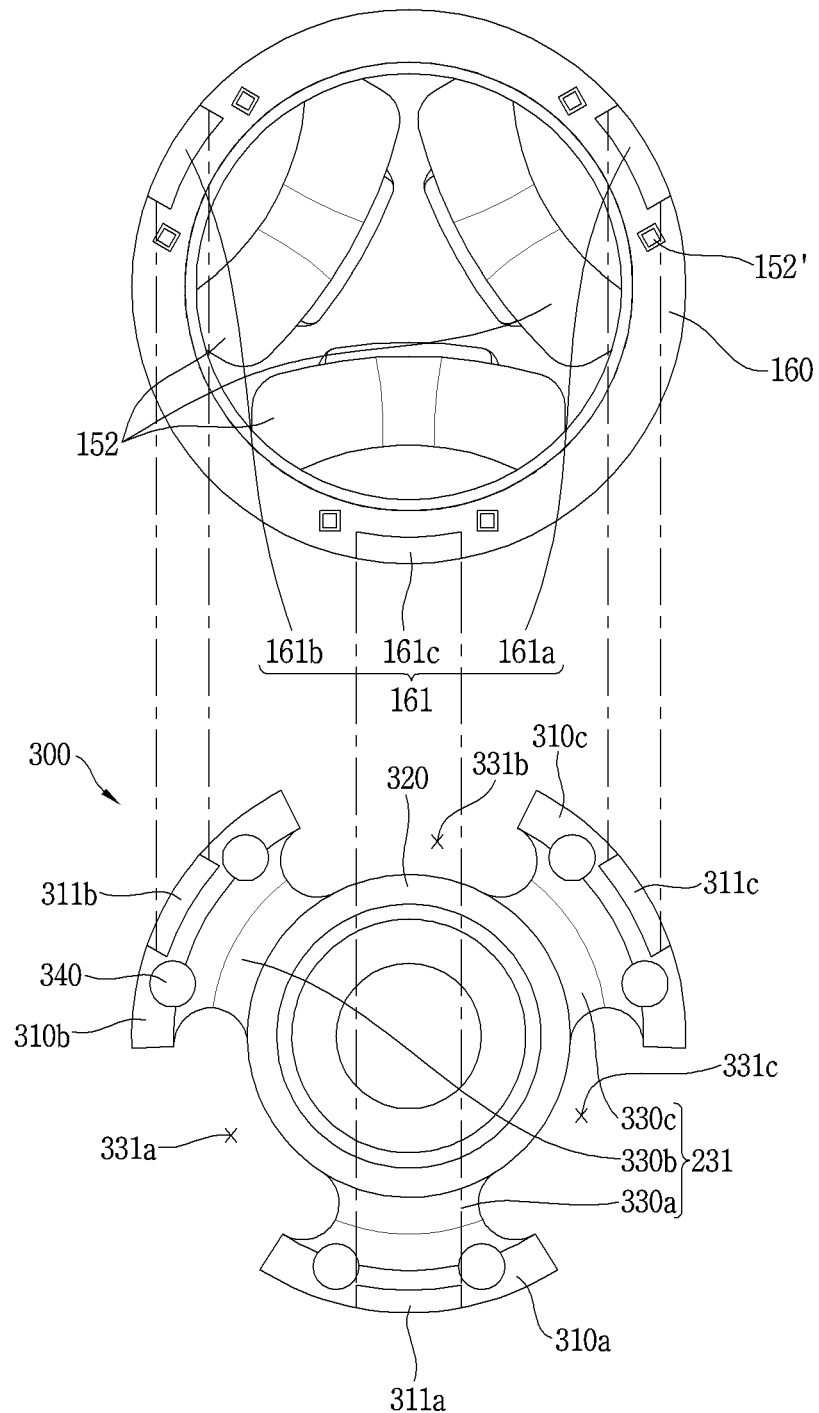
FIG. 12B illustrates a planar view of the lower bracket and a bottom view of an insulator assembly.

FIG. 12B illustrates a planar view of the lower bracket 300 and a bottom view of the insulator assembly 150.

The plurality of air inlets 331a, 331b, and 331c may be disposed at corresponding positions between the adjacent stator coils 152, to implement a straight structure of the inner flow path, as described above.

Also, the mounting part 311 may protrude from one side of the insulator coupling part 310. A protruding direction of the mounting part 311 may be a direction coupled to the insulator 160.

Meanwhile, the mounting guide part 161 may be recessed into one side of the insulator 160.

The shape of the mounting guide part 161 may correspond to the shape of the mounting part 311.

Referring to FIGS. 12A and 12B, a first mounting portion 311a, a second mounting portion 311b, and a third mounting portion 311c that constitute the mounting part 311 may protrude from the first insulator coupling portion 310a, the second insulator coupling portion 310b, and the third insulator coupling portion 311c that constitute the insulator coupling part 311.

The mounting part 311 (311a, 311b, 311c) may be mounted while sliding along the mounting guide part 161.

The mounting part 311 may have a preset angle with respect to the center of the lower bracket 200.

The mounting guide part 161 may also have a preset angle with respect to the center of the insulator 160.

The position where the mounting guide part 161 is formed may correspond to a position where the mounting part 311 is formed in the vertical direction.

Therefore, while any one mounting portion of the mounting pat 311 is slid into any one mounting guide portion of the mounting guide part 161, another mounting portion can be coupled to another mounting guide portion.

For example, while the first mounting portion 311a is slid into the first mounting guide portion 161a, the second mounting portion 311b may be mounted to the second mounting guide portion 161b, and the third mounting portion 311c may be coupled to the third mounting guide portion 161c.

Figure 13:
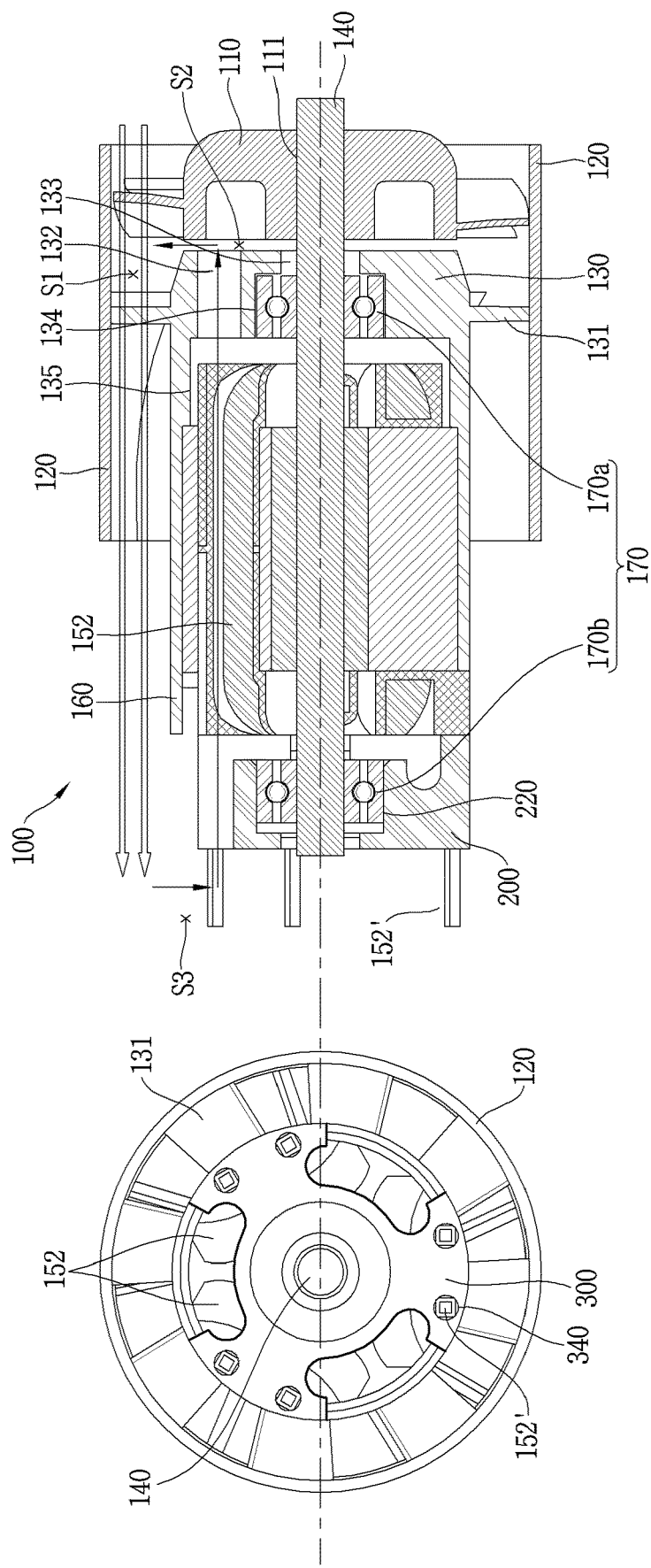
FIG. 13 is a conceptual view illustrating returning flow formed in the fan motor having the lower bracket with the another shape.

FIG. 13 is a conceptual view illustrating returning flow formed in the fan motor 100 having the lower bracket 300 with the another shape.

Unlike the lower bracket 200 described above, the lower bracket 300 illustrated in FIG. 13 does not have an air hole 231 through which air is suctioned. However, since the air inlets 331a, 331b, and 331c of the air inlet part 331 are defined between the adjacent connection portions 330a, 330b, and 330c of the connection part 330, air may be introduced through the air inlet part 331.

In other words, the lower bracket 300 may be formed to be recessed at a position corresponding to the space defined between the stator coils 152. According to the lower bracket 300 having such a structure, an amount of suctioned air can increase, unlike the lower bracket 300 described above.

Similar to the returning flow described with reference to FIG. 8, the returning flow formed by the lower bracket with the another shape will be described again.

The flow of air generated by the impeller 110 that rotates forms the main flow path. In this case, pressure at the main flow path upper point S1 is lowered.

Since atmospheric pressure acts on the inner flow path upper point S2 formed at the same height, the flow of air is directed to the main flow path upper point S1 from the inner flow path upper point S2.

Meanwhile, a fan motor external point S3 is placed on a straight line of the inner flow path upper point S2. As the air moves from the inner flow path upper point S2 to the main flow path upper point S1, pressure at the inner flow path upper point S2 is lower than that of the fan motor external point S3.

Accordingly, the air moves from the fan motor external point S3 to the inner flow path upper point S2.

With this structure, a returning flow is made inside and outside the fan motor 100.

Meanwhile, the plurality of air inlets 331a, 331b, and 331c are arranged to correspond to the spaces defined between the adjacent stator coils 152. In addition, the plurality of heat dissipation holes 132a, 132b, and 132c are located to correspond to the spaces defined between the adjacent stator coils 152.

That is, the air inlet part 331, the heat dissipation hole 132, and the space defined between the adjacent stator coils 152 that constitute the inner flow path are located on the straight line along the axial direction.

A repetition time of a returning flow cycle can be reduced by reducing or minimizing flow loss of the inner flow path. That is, the returning flow can be smoothly formed, and cooling efficiency inside the fan motor 100 can increase accordingly.

Meanwhile, referring to FIG. 13, a portion of the stator coil 152 is exposed at a point where air is suctioned in the lower bracket 300. The portion of the stator coil 152 may be exposed to the suctioned air by an area wider than that of the portion of the stator coil 152 exposed in the lower bracket 200 described above.

Through this, an amount of air directly applied to the stator coil 152, which generates a lot of heat, can increase, and thus an increase in cooling effect can be expected.

Compared to the cross-sectional area of the space defined in the lower bracket 300, the cross-sectional area of the space formed inside the stator is narrower, so the flow rate of the suctioned air may decrease toward the inside of the stator.

However, since the amount of air initially suctioned through the lower bracket 200 can increase, an increase in cooling effect inside the stator can be expected.

The fan motor described above may not be limited to the configurations and methods of the aforementioned embodiments, but all or some of the embodiments may be selectively combined so that various modifications can be made.

The invention claimed is:
1. A fan motor comprising:
   a housing:
   a vane hub accommodated in the housing;
   a stator mounted inside the vane hub and having a stator core, stator coils wound around the stator core, each stator coil having a power line extending therefrom, and an insulator insulating the stator core from the stator coils;
   a rotor rotatably installed inside the stator;
   a shaft coupled to the rotor to be rotatable; and
   a lower bracket coupled to the insulator, the lower bracket comprising:
      a plurality of power line lead-out holes extending through the lower bracket, such that the power lines extending from the stator coils are inserted therethrough; and
      a plurality of air holes configured to suction air toward the stator,
   wherein the vane hub includes a plurality of heat dissipation holes extending through the vane hub such that air passing through the stator is discharged,
   wherein each of the plurality of heat dissipation holes overlaps a respective air hole of the plurality of air holes in an up and down direction, and
   wherein a total cross-sectional area of the plurality of air holes is equal to a total cross-sectional area of the plurality of heat dissipation holes, so as to reduce air resistance while the air flows into the stator.
2. The fan motor of claim 1, further comprising a lower bearing coupled to one side of the shaft,
   wherein the lower bracket further comprises:
      a body part formed in a hollow cylindrical shape;
      a lower bearing support part having a diameter smaller than that of the body part and surrounding and supporting the lower bearing; and
      a connection part connecting an inner surface of the body part and an outer surface of the lower bearing support part.
3. The fan motor of claim 2, wherein the plurality of air holes extend through the connection part at positions spaced apart by the same distance from a center of the lower bracket.
4. The fan motor of claim 2, wherein each of the plurality of air holes has an elliptical shape, and one side of each air hole is bent toward a center of the lower bracket.
5. The fan motor of claim 2, further comprising a mounting part protruding from the body part in a direction to be coupled to the insulator,
   wherein the mounting part is mounted in a mounting guide part formed as a recess from an outside of the insulator.
6. The fan motor of claim 2, wherein the lower bearing support part comprises:
   a first support surface supporting an outer circumferential surface of the lower bearing; and
   a second support surface supporting a bottom surface of the lower bearing, and
   wherein a hole through which the shaft is inserted is formed through the second support surface.
7. The fan motor of claim 1, wherein each of the plurality of air holes is formed at a position corresponding to a space defined between adjacent stator coils, so that suctioned air flows through the space defined between the stator coils.
8. The fan motor of claim 1, wherein the lower bracket is made of an insulating member for insulation from the power lines extending from the stator coils.
9. The fan motor of claim 2, wherein the plurality of air holes extend in a direction parallel to an extension direction of the shaft.
10. The fan motor of claim 1, wherein the plurality of air holes are formed through between the adjacent power line lead-out holes in a circumferential direction.
11. The fan motor of claim 5, further comprising an upper bearing coupled to another side of the shaft,
    wherein the upper bearing is fixedly supported along an upper bearing support part inside the vane hub, and
    wherein the lower bearing is fixed by the lower bearing support part.
12. A fan motor comprising:
    a housing:
    an outer vane hub accommodated in the housing;
    a stator mounted inside the vane hub and having a stator core, stator coils wound around the stator core, each stator coil having a power line extending therefrom, and an insulator insulating the stator core from the stator coils; and
    a lower bracket coupled to the insulator, the lower bracket including:
       a lower bearing support part surrounding and supporting a bearing coupled to one side of the shaft; and
       an insulator coupling part protruding from an outer surface of the lower bearing support part, the insulator coupling part including:
          power line lead-out holes through which the power lines extending from the stator coils are inserted; and
          a plurality of air holes configured to suction air toward the stator,
    wherein the vane hub includes a plurality of heat dissipation holes extending through the vane hub such that air passing through the stator is discharged,
    wherein each of the plurality of heat dissipation holes overlaps a respective air hole of the plurality of air holes in an up and down direction, and
    wherein a total cross-sectional area of the plurality of air holes is equal to a total cross-sectional area of the plurality of heat dissipation holes, so as to reduce air resistance while the air flows into the stator.
13. The fan motor of claim 12, wherein the lower bracket is recessed at a position corresponding to a space defined between portions where the stator coils are wound, so that suctioned air flows into the space.

14. The fan motor of claim 12, wherein the lower bracket is made of an insulating member for insulation from the power lines extending from the stator coils.

\* \* \* \* \*